Patented Apr. 4, 1944

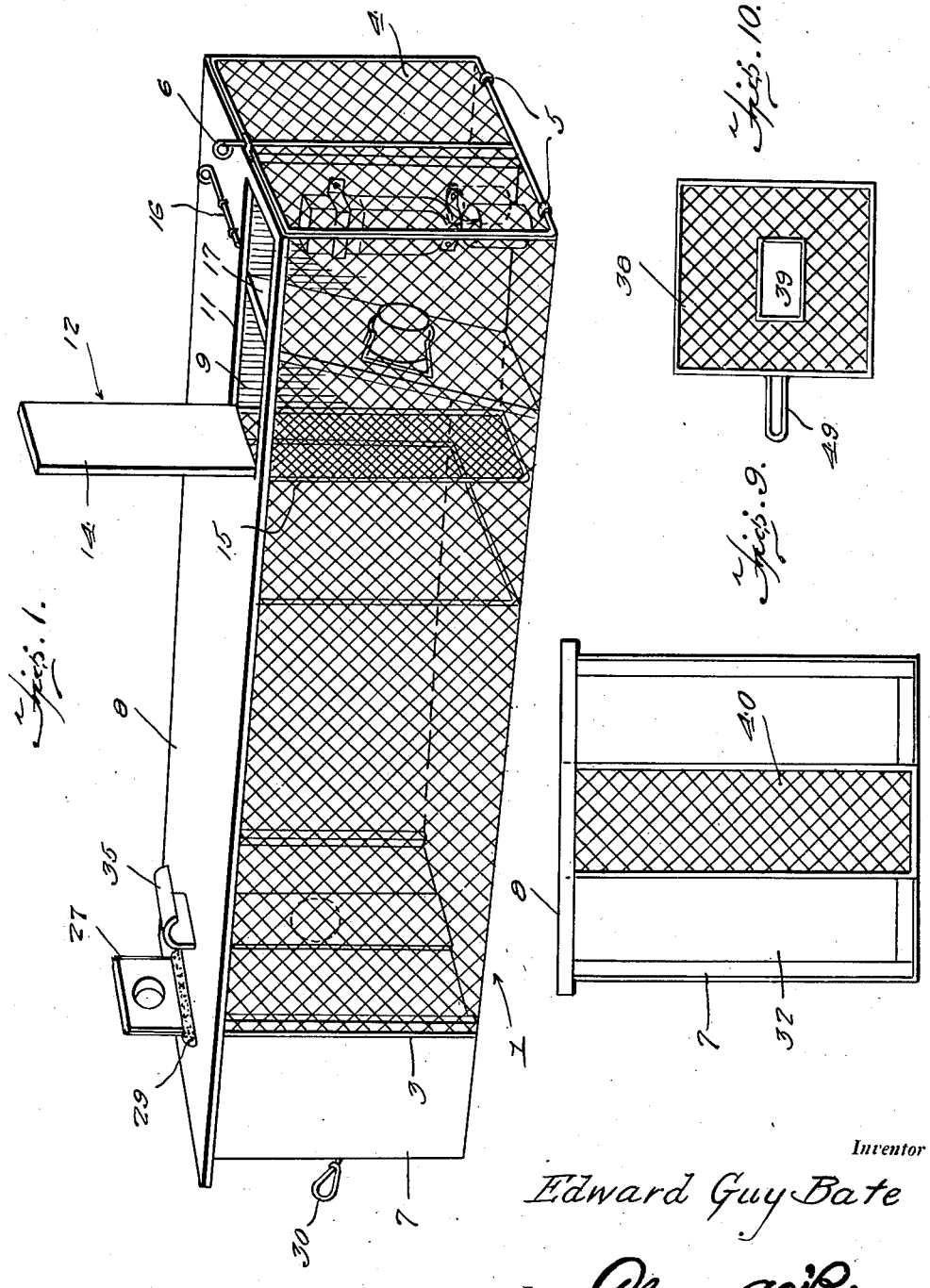

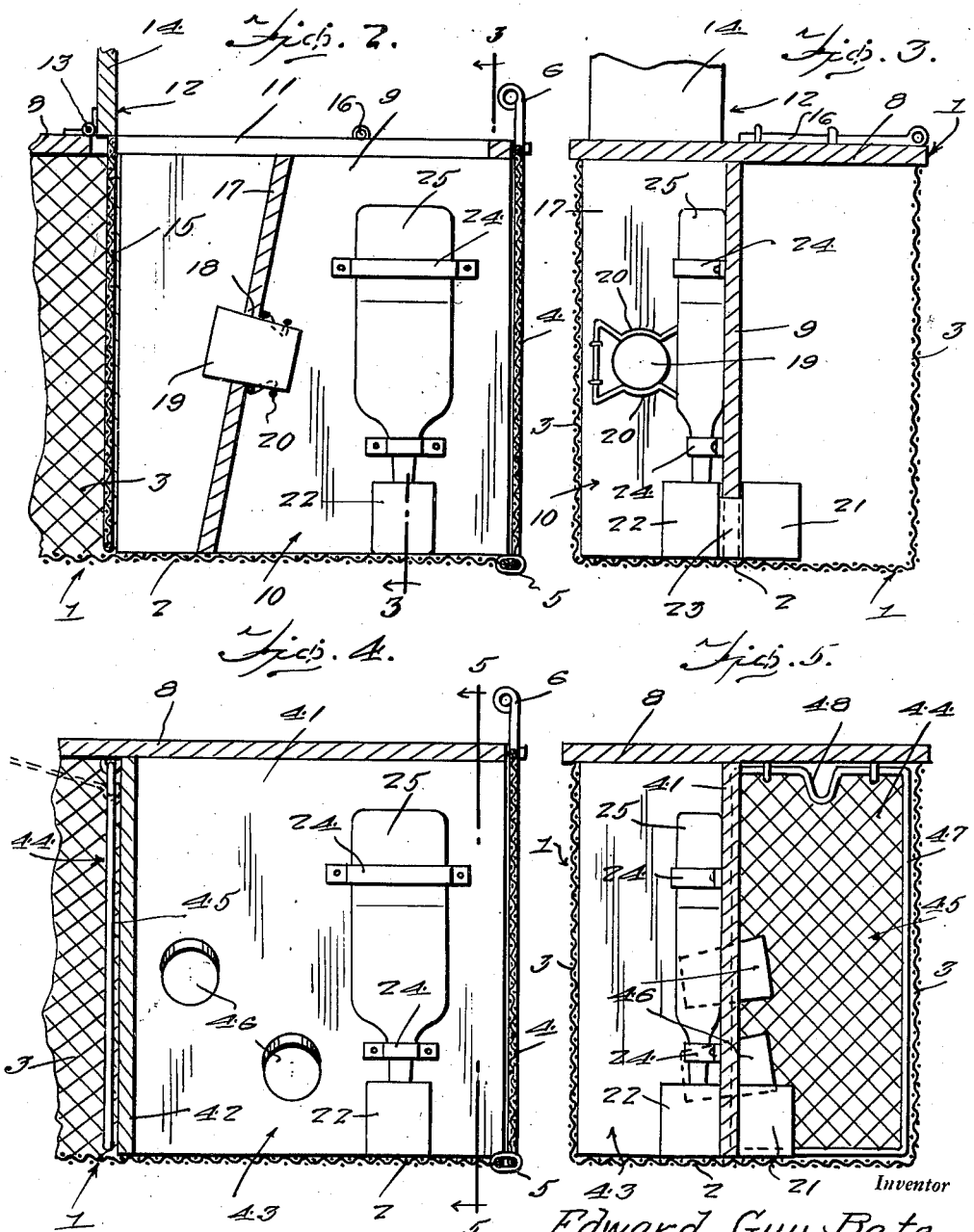

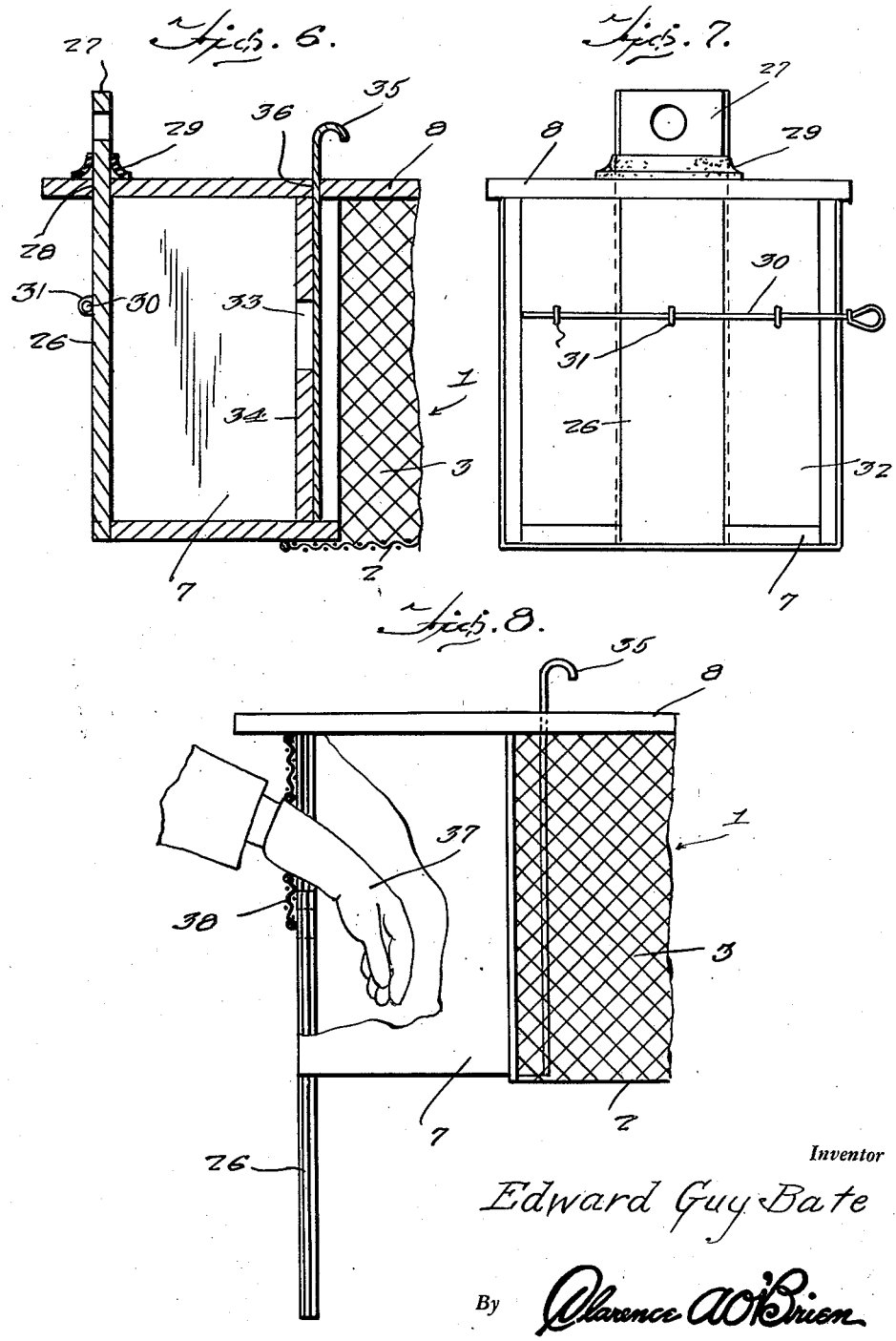

2,346,001

UNITED STATES PATENT OFFICE 2,346,001

ANIMAL PEN

Edward Guy Bate, Winnipeg, Manitoba, Canada

Application December 27, 1941, Serial No. 424,629

2 Claims. (Cl. 119—17)

The present invention relates to new and useful improvements in animal pens, particularly for mink, although it will be understood, of course, that the device may be used for any other animals for which it may be found adapted and desirable.

The primary object of the invention is to provide, in a manner as hereinafter set forth, an animal pen of the character described comprising a unique construction and arrangement of feeding and watering means.

Another very important object of the invention is to provide a pen of the aforementioned character which includes novel means for excluding the animal from the portion of the enclosure which comprises the feeding and watering elements thereby permitting access to be readily had to this portion of the pen without danger of the animal escaping or being injured.

Still another very important object of the invention is to provide a pen of the character set forth comprising a nest in which the animal may be conveniently trapped when desired to facilitate catching and removing said animal or for any other purpose.

Other objects of the invention are to provide an animal pen of the character set forth which will be comparatively simple in construction, strong, durable, highly efficient and reliable in use, compact, light in weight, sanitary and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a perspective view of an animal pen constructed in accordance with the present invention.

Figure 2 is a view in vertical longitudinal section through one end portion thereof.

Figure 3 is a cross-sectional view, taken substantially on the line 3—3 of Figure 2.

Figure 4 is a view in vertical longitudinal section through an end portion of another form of the invention.

Figure 5 is a cross-sectional view through the modification, taken substantially on the line 5—5 of Figure 4.

Figure 6 is a view in vertical longitudinal section through the other end portion of the pen.

Figure 7 is an end elevational view of the device.

Figure 8 is a view in side elevation of the nest with a portion thereof broken away to illustrate one method of removing the animal.

Figure 9 is a view in end elevation, showing a screen closure for the nest.

Figure 10 is a detail view in front elevation of the guard which may be employed when removing an animal.

Referring now to the drawings in detail, it will be seen that reference numeral 1 designates generally an elongated enclosure of suitable dimensions. The enclosure 1 includes a bottom 2, sides 3 and an end wall 4 of suitable wire mesh, said end wall being hingedly connected to said bottom at 5. A vertical latching rod 6 releasably secures the end wall 4 in closed position. On the other end of the enclosure 1 is a nest 7. The enclosure 1 further includes a top 8 which, it will be observed, also constitutes the top or roof of the nest 7. The nest 7 and the top 8 may be of wood or other suitable material.

In one end portion of the enclosure 1 is a longitudinal partition 9 providing a compartment or chamber 10. A longitudinally elongated opening 11 in the top 8 communicates with the chamber 10. Mounted for swinging movement in a vertical plane on the top 8 is a double closure 12. Hinges 13 (see Fig. 2) secure the closure 12 at an intermediate point to the top 8. The closure 12 includes a wooden door 14 for the opening 11 and a foraminous section 15 which, when in lowered or operative position, prevents the animal from entering the chamber 10. A transversely slidable rod 16 is provided on the top 8 for releasably securing the door 14 in closed position in the opening 11 with the foraminous door 15 in raised or inoperative position beneath the top 8.

Mounted transversely in the chamber 10 is an inclined panel 17 having a circular opening 18 therein. The opening 18 is for the reception of a removable tapered feed tumbler on other suitable receptacle 19. It will be observed that the feed tumbler 19 is thus mounted at an inclination in the chamber 10. A resilient clamp 20 on the back of the panel 17 frictionally secures the feed tumbler 19 in position.

Positioned on opposite sides of the longitudinal partition 9 are connected, communicating water cups or receptacles 21 and 22. The restricted connection 23 between the cups 21 and 22 passes through the partition 9. Thus, the cups 21 and 22 are firmly secured in position. Removably mounted in holders 24 on the partition 9 is an inverted water bottle 25 having its mouth extending downwardly into the cup 22. Thus, a constant water level is barometrically maintained in the cup 21.

Access to the nest 7 from the outside is had through a vertically slidable front door 26. The door 26 comprises an apertured upper portion 27 which extends above the top 8 for convenient operation. A slot 28 in the top 8 accommodates the door 26. A suitable rubber seal 29 prevents leakage through the slot 28 around the door 26. A removable horizontal rod 30 releasably secures the door 26 in closed position, said rod being slidable in staples 31 which are provided therefor on said door and on the front 32 of said nest. A tongue and groove connection is provided between the vertical edges of the door 26 and the front 32 of the nest.

The nest 7 communicates with the enclosure 1 through an opening 33 in the inner wall 34 of said nest. A vertically slidable metallic plate 35 is provided for closing the opening 33 when, for example, it is desired to trap the animal in the nest 7. Of course, the closure 35 may also be utilized for excluding the animal from the nest. The closure 35 is operable in a slot 36 which is provided therefor in the top 8. The enclosure 1 is primarily intended for use as a furring-out pen.

As suggested in Figure 8 of the drawings, access to the nest 7 may be had by sliding the door 26 downwardly and inserting a gloved hand 37. For closing the opening thus made, a screen guard 38 is mounted on the wrist for positively preventing the escape of the animal. When the nest 8 is to be closed, the door 26 is raised. When access to the chamber 10 is desired, the closure 12, after the rod 16 is retracted, is swung upwardly to a substantially vertical position, as seen in Figure 1 of the drawings. In this manner the feed and water may be conveniently replenished in the chamber 10 while the animal is excluded therefrom. The guard 38 is provided with an opening 39 through which the hand is slipped. This guard 38 may be used when the end gate of the enclosure is opened for cleaning the pen or feeding the animals. The guard 38 further includes a handle 49. In Figure 9 of the drawings there is shown a vertically slidable screen door 40 which may be used in lieu of the wooden door 26.

In the modification illustrated in Figures 4 and 5 of the drawings, longitudinal and transverse wooden partitions 41 and 42 define a chamber 43 in one end portion of the enclosure 1. Pivotally suspended for swinging movement from the top 8 is a wire gate or door 44 which, in conjunction with the longitudinal partition 41, defines a feeding and watering chamber 45.

Mounted at an inclination in openings provided therefor in the partition 41 is a plurality of removable feed tumblers 46. Any desired number of the tumblers 46 may be provided and they may be mounted at any suitable elevations in the partition 41.

The hinged end wall 4 of the enclosure 1 permits access to be readily had to the chambers 43 and 45 from the outside of the pen. Before the end wall or closure 4 is opened, the gate or door 44 is swung downwardly to operative position thereby excluding the animals from the chamber 45. The upper bar of the frame 47 of the door 44 includes a substantially V-shaped portion 48 with which a suitable instrument may be engaged for opening and closing said door. Any suitable means may be provided for releasably securing the door 44 in raised or open position.

It is believed that the many advantages of an animal pen constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

1. An animal pen of the character described comprising an enclosure, an upright member in said enclosure, said member having a circular opening therein, and a tapered, inclined feed receptacle of tubular cross section removably mounted in the opening, said receptacle being closed at its lower end and open at its upper end.

2. An animal pen of the character described comprising an elongated enclosure, a vertical, longitudinal partition in one end portion of the enclosure, feeding and watering means on the partition, a transverse partition in the enclosure, and a door suspended for swinging movement in a vertical plane in the enclosure and, when in closed position, being transversely aligned with the second-named partition, the partitions and said door providing parallel chambers in the enclosure.

EDWARD GUY BATE.